(12) United States Patent
Tillman et al.

(10) Patent No.: US 10,491,946 B2
(45) Date of Patent: *Nov. 26, 2019

(54) METHODS AND SYSTEMS FOR PROVIDING MULTIPLE VIDEO CONTENT STREAMS

(71) Applicant: The DIRECTV Group, Inc., El Segundo, CA (US)

(72) Inventors: Thomas M. Tillman, Hawthorne, CA (US); Cheng-Chih Steve Lin, Santa Monica, CA (US); Javier Lemus, Santa Ana, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/011,078

(22) Filed: Jun. 18, 2018

(65) Prior Publication Data

US 2018/0302667 A1 Oct. 18, 2018

Related U.S. Application Data

(63) Continuation of application No. 15/251,059, filed on Aug. 30, 2016, now Pat. No. 10,028,016.

(51) Int. Cl.
*H04N 21/44* (2011.01)
*G11B 27/031* (2006.01)
(Continued)

(52) U.S. Cl.
CPC ............ *H04N 21/44* (2013.01); *G06F 3/011* (2013.01); *G06F 3/04815* (2013.01);
(Continued)

(58) Field of Classification Search
CPC ............ H04N 21/8173; H04N 21/235; H04N 21/41407; H04N 21/4622; H04N 21/4722;
(Continued)

(56) References Cited

U.S. PATENT DOCUMENTS 5,986,692 A 11/1999 Logan et al.
6,014,184 A 1/2000 Knee
(Continued)

FOREIGN PATENT DOCUMENTS

CN 102595212 A 7/2012
CN 105230005 5/2014
(Continued)

OTHER PUBLICATIONS

"AMD FirePro™ W600", www.amd.com, Apr. 4, 2014.
(Continued)

*Primary Examiner* — Nathan J Flynn
*Assistant Examiner* — Caroline Somera
(74) *Attorney, Agent, or Firm* — Guntin & Gust, PLC; Atanu Das

(57) ABSTRACT

Aspects of the subject disclosure may include, for example, providing multiple video content streams to a display for presentation. The display comprises a primary screen region that presents a first video content stream of the multiple video content streams and multiple auxiliary screen regions that present a subset of the multiple video content streams. Further aspects may include providing a message to the display responsive to receiving a first user-generated input instructing the display to present a second video content stream on the primary screen region. Additional aspects may include recording the first video content stream from a point of departure of the first video content stream. Also, aspects may include providing the recorded first video content stream to the display responsive to obtaining a second user-generated input. The recorded first video content stream is presented on the primary screen region from the point of departure. Other embodiments are disclosed.

20 Claims, 10 Drawing Sheets

(51) Int. Cl.
| | |
|---|---|
| *G11B 27/34* | (2006.01) |
| *G06F 3/01* | (2006.01) |
| *H04N 21/8549* | (2011.01) |
| *H04N 21/436* | (2011.01) |
| *H04N 21/433* | (2011.01) |
| *H04N 21/431* | (2011.01) |
| *H04N 21/488* | (2011.01) |
| *H04N 21/43* | (2011.01) |
| *G06F 3/0481* | (2013.01) |

(52) U.S. Cl.
CPC ............ *G11B 27/031* (2013.01); *G11B 27/34* (2013.01); *H04N 21/4307* (2013.01); *H04N 21/4314* (2013.01); *H04N 21/4334* (2013.01); *H04N 21/43615* (2013.01); *H04N 21/44008* (2013.01); *H04N 21/4882* (2013.01); *H04N 21/8549* (2013.01)

(58) Field of Classification Search
CPC ......... H04N 21/47815; H04N 21/6581; H04N 21/812
USPC .......................................................... 725/78
See application file for complete search history.

(56) References Cited

U.S. PATENT DOCUMENTS

| | | |
|---|---|---|
| 6,188,442 B1 | 2/2001 | Narayanaswami |
| 6,744,926 B1 | 6/2004 | Nishigaki |
| 6,922,815 B2 | 7/2005 | Rosen et al. |
| 7,458,093 B2 | 11/2008 | Dukes et al. |
| 7,861,166 B1 | 12/2010 | Hendricks et al. |
| 8,368,721 B2 | 2/2013 | McCoy |
| 8,434,117 B2 | 4/2013 | de Heer et al. |
| 8,584,174 B1 | 11/2013 | Angiolillo et al. |
| 8,668,561 B2 | 3/2014 | Jones et al. |
| 8,745,258 B2 | 6/2014 | Porter et al. |
| 8,773,331 B2 | 7/2014 | Candelore et al. |
| 9,129,430 B2 | 9/2015 | Salter et al. |
| 9,131,166 B2 | 9/2015 | Choi |
| 9,141,859 B2* | 9/2015 | Vunic ................ G06K 9/00711 |
| 9,215,397 B2 | 12/2015 | Ellis et al. |
| 9,219,967 B2 | 12/2015 | Nquyen et al. |
| 9,319,735 B2 | 4/2016 | Knee et al. |
| 9,524,282 B2 | 12/2016 | Algreatly et al. |
| 10,073,262 B2 | 9/2018 | Nakai et al. |
| 2004/0261106 A1 | 12/2004 | Hoffman et al. |
| 2005/0239549 A1 | 10/2005 | Salvatore et al. |
| 2008/0032797 A1 | 2/2008 | Harris et al. |
| 2008/0062318 A1 | 3/2008 | Ellis et al. |
| 2008/0088706 A1 | 4/2008 | Girgensohn et al. |
| 2011/0164163 A1 | 7/2011 | Bilbrey et al. |
| 2012/0011552 A1* | 1/2012 | Yao .................. H04N 21/23418 725/88 |
| 2012/0174173 A1 | 7/2012 | Brood et al. |
| 2012/0314087 A1 | 12/2012 | Tong et al. |
| 2013/0021524 A1 | 1/2013 | Tang et al. |
| 2013/0046856 A1 | 2/2013 | Joong et al. |
| 2013/0083003 A1 | 4/2013 | Perez et al. |
| 2013/0151603 A1 | 6/2013 | Lobb et al. |
| 2014/0011587 A1 | 1/2014 | Hughes et al. |
| 2014/0085437 A1 | 3/2014 | Unkel et al. |
| 2014/0362201 A1 | 12/2014 | Nguyen et al. |
| 2014/0375683 A1 | 12/2014 | Salter et al. |
| 2015/0248792 A1 | 9/2015 | Abovitz et al. |
| 2015/0317829 A1 | 11/2015 | Carter et al. |
| 2015/0325054 A1 | 11/2015 | Salter et al. |
| 2016/0071546 A1 | 3/2016 | Neymotin et al. |
| 2016/0165308 A1 | 6/2016 | Stern |
| 2016/0210784 A1 | 7/2016 | Ramsby et al. |
| 2016/0232183 A1 | 8/2016 | Roberts |
| 2017/0244931 A1 | 8/2017 | Faulkner |
| 2018/0063576 A1 | 3/2018 | Tillman et al. |
| 2019/0007750 A1 | 1/2019 | Tillman, Jr. |

FOREIGN PATENT DOCUMENTS

| | | |
|---|---|---|
| EP | 2826240 A1 | 1/2015 |
| WO | 2015148693 | 1/2015 |
| WO | 2016105322 | 6/2016 |
| WO | 2016119868 | 8/2016 |
| WO | 2016154663 A1 | 10/2016 |

OTHER PUBLICATIONS

"Arrive. Connect. Record. Multicamera event recording made simple", www.matrox.com, Aug. 8, 2014.
"Clarity Matrix MultiTouch", www.planar.com, Dec. 16, 2013.
"Expand and Customize to Suit Your Application", panasonic.net, Jul. 18, 2015.
Rushing, Krissy, "5 tips for creating a multiscreen sports haven", www.technologytell.com, Jan. 31, 2014.

* cited by examiner

400

METHODS AND SYSTEMS FOR PROVIDING MULTIPLE VIDEO CONTENT STREAMS

CROSS-REFERENCE TO RELATED APPLICATIONS

This application is a continuation of U.S. patent application Ser. No. 15/251,059, filed Aug. 30, 2016, the contents of which are incorporated by reference into this application as if set forth herein in full.

FIELD OF THE DISCLOSURE

The subject disclosure relates to methods and system for providing multiple video content streams.

BACKGROUND

Modern communication networks have capacity to provide multiple video content streams from video content servers to communication devices of end users. Further, edge networks have recently increased their capacity to deliver high bit rate applications such as delivery of multiple video content streams. Edge networks can include technology such as wired broadband access networks, digital subscriber line networks, and cable television access networks as well satellite access networks and fiber optic networks. In addition, media processors and gateways located at a premises receive and process the multiple video content streams then deliver different video content streams to different communication devices within the premises.

BRIEF DESCRIPTION OF THE DRAWINGS

Reference will now be made to the accompanying drawings, which are not necessarily drawn to scale, and wherein.

DETAILED DESCRIPTION

Figure 1:
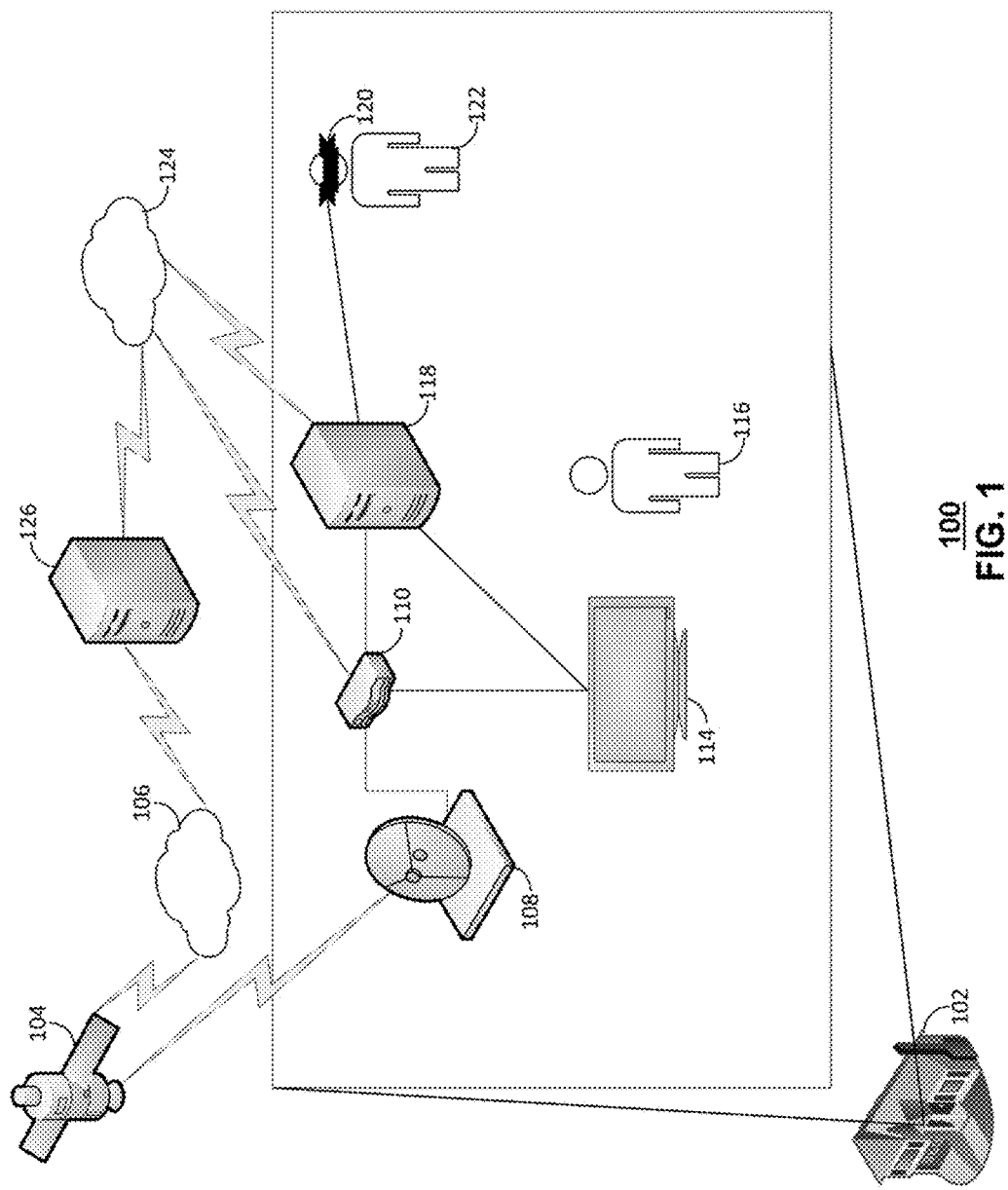
FIGS. 1-4 depict illustrative embodiments of providing multiple video content streams to a premises.

The subject disclosure describes, among other things, illustrative embodiments for providing a plurality of video content streams to a display for presentation of the plurality of video content streams. The display comprises a plurality of screen regions including a primary screen region that presents a first video content stream of the plurality of video content streams and a plurality of auxiliary screen regions that presents a subset of the plurality of video content streams. Further embodiments can include providing a message to the display responsive to receiving a first user-generated input. The message instructs the display to present a second video content stream on the primary screen region according to the first user-generated input. Additional embodiments can include recording the first video content stream from a point of departure of the first video content stream resulting in a recorded first video content stream. The recorded first video content stream may not include advertising content. Also, embodiments can include providing the recorded first video content stream to the display responsive to obtaining a second user-generated input. The recorded first video content stream is presented on the primary screen region of the display from the point of departure according to the second user-generated input. Other embodiments are described in the subject disclosure.

One or more aspects of the subject disclosure include a device, comprising a processing system including a processor and a memory that stores executable instructions that, when executed by the processing system, facilitate performance of operations. The operations can include receiving multiple video content streams. Further operations can include providing the multiple video content streams to a display for presentation of the multiple video content streams. The display can comprise multiple screen regions including a primary screen region that presents a first video content stream of the multiple video content streams. The multiple screen regions can also include multiple auxiliary screen regions that present a subset of the multiple video content streams. Additional operations can include detecting an event in a second video stream of the multiple video content streams. Other operations can include providing an indication to the display responsive to the detecting of the event. The indication instructs the display to present the second video content stream on the primary screen region according to the detecting of the event. Further operations can include recording the first video content stream from a point of departure of the first video content stream resulting in a recorded first video content stream. Additional operations can include providing the recorded first video content stream to the display for presentation on the primary screen region from the point of departure responsive to obtaining a first user-generated input. The first user-generated input indicates to switch from presenting the second video content steam on the primary screen region to presenting the recorded first video content stream on the primary screen region.

One or more aspects of the subject disclosure include a machine-readable storage medium, comprising executable instructions that, when executed by a processing system including a processor, facilitate performance of operations. The operations can include providing multiple video content streams to a display for presentation of the multiple video content streams. The display can comprise multiple screen regions including a primary screen region that presents a first video content stream of the multiple video content streams. The multiple screen regions can also include multiple auxiliary screen regions that present a subset of the plurality of video content streams. Further operations can include providing a message to the display responsive to receiving a first user-generated input. The message instructs the display to present a second video content stream on the primary screen region according to the first user-generated input. Additional operations can include recording the first video content stream from a point of departure of the first video content stream resulting in a recorded first video content stream. The recorded first video content stream may not include advertising content. Other operations can include providing the recorded first video content stream to the display responsive to obtaining a second user-generated input. The recorded first video content stream can be presented on the primary screen region of the display from the point of departure according to the second user-generated input.

One or more aspects of the subject disclosure include a method. The method can include receiving, by a processing system including a processor, multiple video content streams. Further, the method can include providing, by the processing system, the multiple video content streams to a display for presentation of the multiple video content streams. The display can comprise multiple screen regions including a primary screen region that presents a first video content stream of the multiple video content streams. The multiple screen regions can also include multiple auxiliary screen regions that present a subset of the multiple video content streams. In addition, the method can include providing, by the processing system, an avatar associated with a social connection. Also, the method can include receiving, by the processing system, social commentary for a social connection. The social commentary can be related to the multiple video content streams.

FIG. 1 depicts an illustrative embodiment of a system 100 for providing multiple video content streams to a premises 102. In one or more embodiments, a satellite video content provider can use a satellite 104 to distribute video content including multiple video content streams over a communication network 106 to a satellite receiver 108 located at the premises 102. In further embodiments, one of the servers 126 can provide the video content across the communication network 106 to the satellite to be transmitted to the satellite receiver 108 (servers 126 are a collection of servers that can perform various functions as described herein including, but not limited to, media content server, social media server, text messaging server, multimedia messaging server, information server, etc.) In some embodiments, the premises 102 can be a residential premises while in other embodiments, the premises can be a commercial premises (e.g. sports bar, corporate office, etc.). The satellite receiver 108 can provide the received video content to a premises device 110.

In one or more embodiments, the premises device 110 can be communicatively coupled to one of the servers 126, which can be a media content server operated by a media content provider. The media content server 126 can provide video content, including multiple video content streams, to the premises device 110. The media content provider can include, but is not limited to, a cable television provider, an Internet media provider, and an Internet service provider.

Such a premises device 110 can be a media processor, set top box, or gateway device. The premises device 110 can be communicatively coupled to one or more communication devices 114, 120 including display devices and to computer 118. The premises device 110 can be coupled to the communication devices 114, 120 and computer 118 over a wireless communication network (e.g. WiFi network) or a wireless communication link (e.g. Bluetooth®). Also, the premises device 110 can be coupled to the communication devices 114, 120 and computer 118 over a wired connection. One communication device 114 can be a television viewed by a user 116. Another communication device 120 can be a virtual reality headset (e.g. Occulus Rift™) viewed by another user 122. Further, computer 118 can also connected to a communication network 124 and has access to the Internet. In some embodiments, servers 126 are communicatively coupled to the computer 118 over communication network 124. In other embodiments, the servers 126 are coupled to the premises device 110 over communication network 124 and/or via computer 118.

In one or more embodiments, the users 116 and 122 can access multiple video content streams for display simultaneously on communication devices 114, 120. In some embodiments, the multiple video content streams can be the broadcast of multiple football games. The video content can be provided by the satellite receiver 108 or a media content server 126 to the premises device 110. Further, the premises device 110 can include several tuners to extract the multiple video content streams from the video content. Additionally, the premises device 110 can provide all or a subset of the multiple video content streams to communication devices 114, 120 for presentation on their displays simultaneously, via or not via computer 118. In some embodiments, the computer 118 can access content such as football statistics from the one of the servers 126 (e.g. information server) and add such content to the one or more of multiple video content streams to be presented on the displays of communication devices 114, 120.

In one or more embodiments, the multiple video content streams can be provided to other communication devices such as mobile devices (e.g. smartphones, wearable devices, tablet computers, laptop computers), desktop computers, and other home theater devices.

Figure 2:
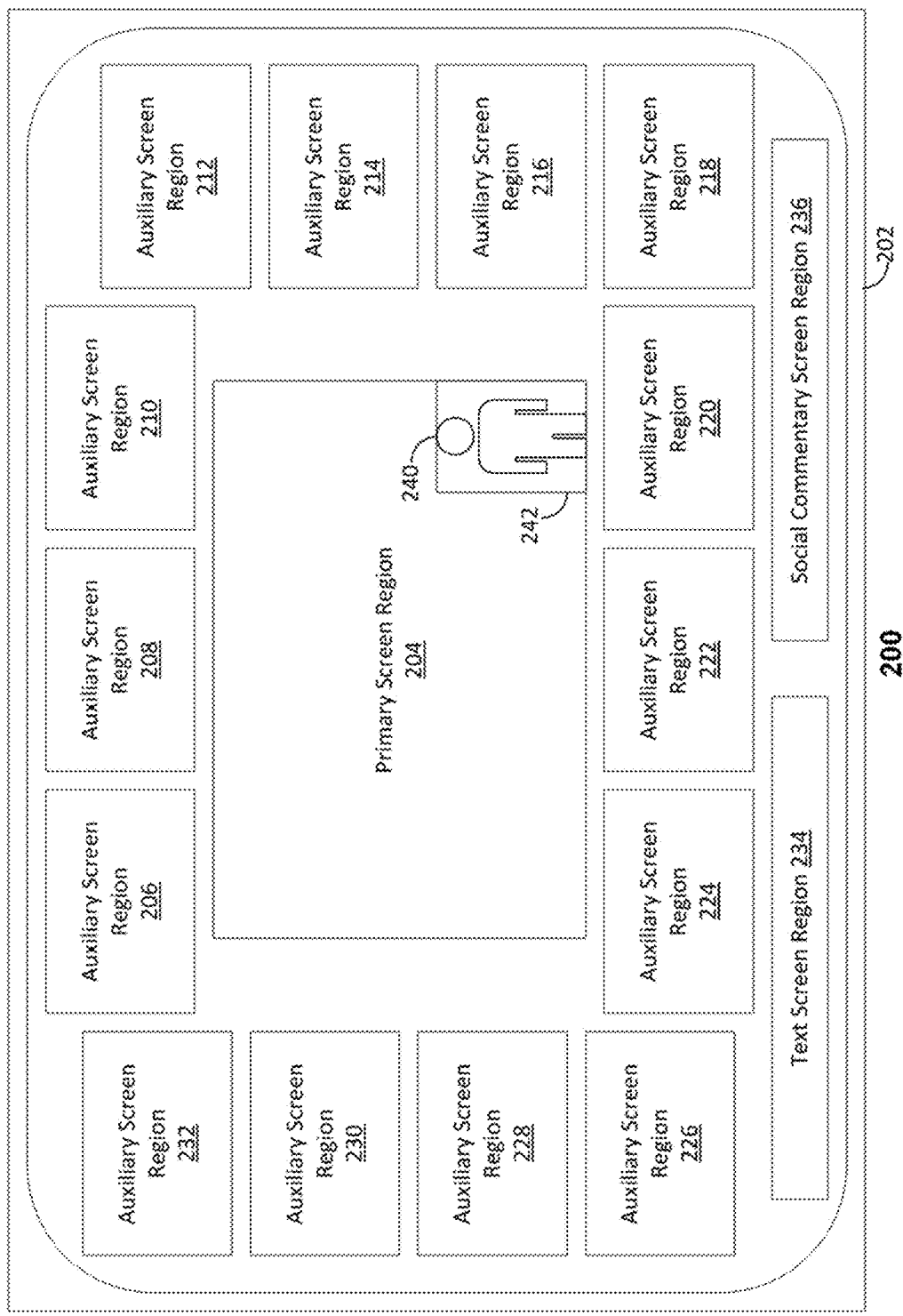

FIG. 2 depicts an illustrative embodiment of system 200 for providing multiple video content streams at a premises 102. In one or more embodiments, the system 200 can include a television 202 having a display. The display can have multiple screen regions include a primary screen region 204 and multiple auxiliary screen regions 206-232. In some embodiments, the television 202 can be provided multiple video content streams from a premises device 110. Each video content stream can be presented on each of the primary screen region 204 and auxiliary screen regions 206-232 simultaneously. Thus, if each of the multiple video content streams is a football game broadcast, then each football game broadcast can be presented on each screen region 204-232 on television 202. Further, the user 116 can configure system 200 to choose which of the football games are presented on the primary screen region 204 and which of the football games of presented on the auxiliary screen regions 206-232. For example, the user 116 may be a fan of the Denver Broncos. Thus, the user 116 can configure system 200 such that the Denver Broncos football game is presented on the primary screen region and each of the other football games can be presented on the auxiliary screen regions. In some embodiments, the primary screen region 204 can present a video content stream at one resolution and the auxiliary screen regions 206-232 can present video content streams in another resolution. In other embodiments, each screen region 204-232 can present video content streams at different resolutions. In further embodiments, each screen region 204-232 can present video content streams with the same resolution. In additional embodiments, the resolution of each screen region can be configured by the user 116. For example, the resolution of the video content stream presented on the primary screen region 204 can be at a 4K resolution and the resolution of the video content stream on each of the auxiliary screen regions 206-232 can be a high definition (HD) resolution. The resolution of video content streams on any of the multiple screen regions 204-232 can include, but not limited so, 4K, ultra-high definition (UHD), HD, and standard definition (SD).

In one or more embodiments, the user 116 can configure system 200 to access football statistics for one or more of the football games. Computer 118 can access the football statistics from one of the servers 126 and provide the football statistics to television 202. In addition, television 202 can present the football statistics with the multiple video content streams. In some embodiments, the football statistics can be presented in a text screen region 234 on the television 202. In other embodiments, the user 116 can configure system 200 to access other textual information from one of the servers 126 to be presented on the text screen region 234. In some embodiments, the textual information is provided to the television 202 directly from computer 118 and/or via premises device 110.

In one or more embodiments, the system 200 can present an avatar 240 on one or more screen regions of television 202. In some embodiments, the avatar 240 can be presented on the primary screen region 204. The avatar 240 can represent another user of system 200, such as another member of the household of premises 102, or can be a social connection, such as from a social media website. This allows the user 116 to have a virtual shared viewing experience with the social connection even if the social connection and the user 116 are in different locations. Further, the computer 118 can access social commentary provided on a social media website by the social connection over communication network 124 from a social media server (which can be one of the servers 126) and provide the social commentary to the television 202. In addition, the television 202 can present the social commentary on a social commentary screen region 236. In other embodiments, instead of the social commentary being provided on a social media website, the social connection can provide the social commentary via a text message or multimedia message. The computer 118 can receive the social commentary over communication network 124 from a text messaging server or a multimedia messaging server (which can be one of the servers 126) and provide the social commentary to the television 202 for presentation. In some embodiments, the social commentary is provided to the television 202 directly from computer 118 and/or via premises device 110.

In one or more embodiments, the user can generate a message for the social connection using an input device of the television 202. The message can be provided by the television directly to, or via the premises device 110 to, the computer 118. The computer 118 can send the message to a social media server or a text/multimedia messaging server (which can be one of the servers 126) to be displayed on a social media website or as a text/multimedia message to the social connection's communication device (e.g. smartphone, tablet computer, laptop computer, etc.).

The user 116 can use various input devices to provide a message to the premises device 110 or computer 118. Such input devices can include touchscreen, gesture detection, voice recognition, keyboard, mouse, and a remote controller of television 202.

Figure 3:
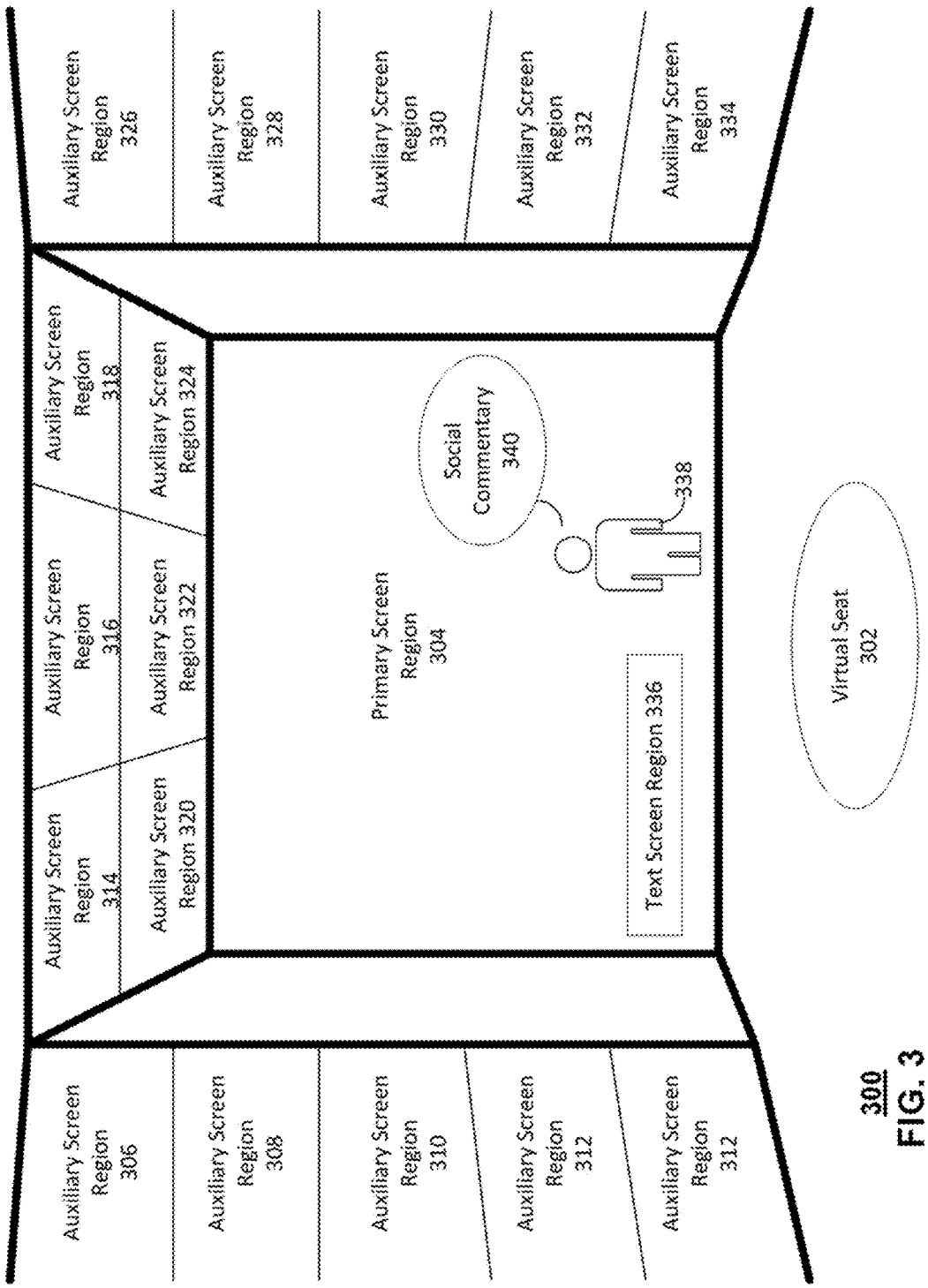

FIG. 3 depicts an illustrative embodiment of providing multiple video content streams to a premises in a virtual reality environment. In one or more embodiments, the premises device 110 receives the video content from the satellite 104 via the satellite receiver 108 or from a media content server (which can be one of the servers 126). The premises device 110 can extract the multiple video content streams from the video content. Further, the multiple video content streams are provided to computer 118. In addition, computer 118 access a virtual reality software application allows computer 118 to render a virtual reality environment on the virtual reality headset 120 for user 122. When rendering the virtual environment, the computer 118 can integrate the multiple video content data streams into the virtual environment to be displayed simultaneously.

In one or more embodiments, the rendered virtual environment can include multiple screen regions 304-334 on a virtual reality headset display 300 of virtual reality headset 120. In some embodiments, the display provide a virtual seat 302 for user 122. In other embodiments, the primary screen region 304 can present a video content stream at one resolution and the auxiliary screen regions 306-334 can present video content streams in another resolution. In other embodiments, each screen region 304-334 can present video content streams at different resolutions. In further embodiments, each screen region 304-334 can present video content streams with the same resolution. In additional embodiments, the resolution of each screen region can be configured by the user 122. For example, the resolution of the video content stream presented on the primary screen region 304 can be at a 4K resolution and the resolution of the video content stream on each of the auxiliary screen regions 306-334 can be a high definition (HD) resolution. The resolution of video content streams on any of the multiple screen regions 304-334 can include, but not limited so, 4K, ultra-high definition (UHD), HD, and standard definition (SD).

In one or more embodiments, each of the multiple video content streams can be a football game broadcast, with each football game broadcast being presented on each screen region 304-334. Further, the user 122 can configure virtual reality headset display 300 to choose which of the football games are presented on the primary screen region 304 and which of the football games of presented on the auxiliary screen regions 306-334. For example, the user 122 may be a fan of the Dallas Cowboys. Thus, the user 122 can configure virtual reality headset display 300 such that the Dallas Cowboys football game is presented on the primary screen region 304 and each of the other football games can be presented on the auxiliary screen regions 306-334.

In one or more embodiments, movement of the head of user 122 in a particular direction or rotation while wearing the virtual reality headset will allow seeing one or more screen regions without seeing one or more other screen regions. Configuration of screen regions in the virtual reality environment can be in various forms (e.g. based on user preference, user-generated input, default configuration by the video content provider, etc.). Such forms can be a mosaic in horizontal and/or vertical directions, a circular carousel in horizontal direction, rectangular sliding panes in the horizontal and/or vertical directions, and so forth. Further, the graphical user interface provided by the virtual reality headset 120 on the virtual reality headset display 300 can provide an indication that gives guidance to the user 122 in which direction or rotation to move the head so that a particular game on a screen region can be seen by the user 122.

In one or more embodiments, the user 122 can configure virtual reality headset 120 to access football statistics for one or more of the football games. Computer 118 can access the football statistics from one of the servers 126 and provides the football statistics to virtual reality headset display 300. In addition, virtual reality headset display 300 can present the football statistics with the multiple video content streams. In some embodiments, the football statistics can be presented in a text screen region 336 on the virtual reality headset display 300. In other embodiments, the user 122 can configure virtual reality headset 120 to access other textual information from one of the servers 126 to be presented on the text screen region 336. In some embodiments, the textual information is provided to the virtual reality headset 122 directly from computer 118 and/or via premises device 110.

In one or more embodiments, the virtual reality headset 120 can present an avatar 338 on one or more screen regions of the virtual reality headset display 300. In some embodiments, the avatar 338 can be presented on the primary screen region 304. The avatar 338 can represent another user that is accessing the virtual environment rendered by the virtual reality headset display 300. This can include another member of the household of premises 102, or can be a social connection, such as from a social media website. This allows the user 122 to have a virtual shared viewing experience with the social connection even if the social connection and the user 122 are in different locations. Further, the computer 118 can access social commentary provided on a social media website by the social connection over communication network 124 from a social media server (which can be one of the servers 126) and provide the social commentary to the virtual reality headset display 300. In addition, the virtual reality headset display 300 can present the social commentary on a social commentary screen region 340. In other embodiments, instead of the social commentary being accessed from a social media website, the social connection can provide the social commentary via a text message or multimedia message. The computer 118 can receive the social commentary over communication network 124 from a text messaging server or a multimedia messaging server (which can be one of the servers 126) and provide the social commentary to the virtual reality headset display 300 for presentation. In some embodiments, the social commentary is provided to the virtual reality headset display 300 directly from computer 118 and/or via premises device 110.

In one or more embodiments, the user can generate a message for the social connection using an input device of the virtual reality headset 120. The message can be provided by the television directly to, or via the premises device 110 to, the computer 118. The computer 118 can send the message to a social media server or a text/multimedia messaging server (which can be one of the servers 126) to be displayed on a social media website or as a text/multimedia message to the social connection's communication device (e.g. smartphone, tablet computer, laptop computer, etc.).

The user 122 can use various input devices to provide a message to the premises device 110 or computer 118. Such input devices can include touchscreen, gesture detection, head movement, voice recognition, keyboard, mouse, and a remote controller of the virtual reality headset 122.

Figure 4:
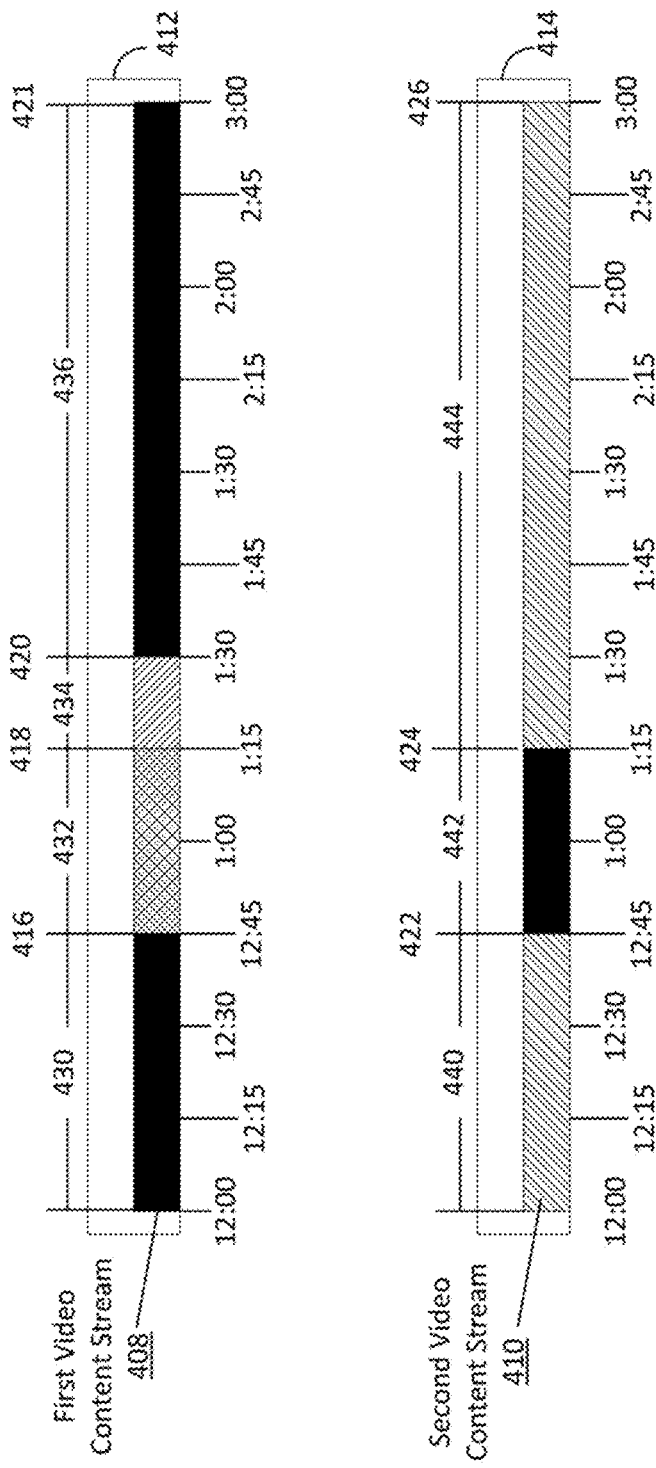

FIG. 4 depicts an illustrative embodiment 400 of providing multiple video content streams to a premises. In one or more embodiments, the premises device 110 and/or computer 118 provides multiple video content streams to a display to present the multiple video content streams on multiple screen regions simultaneously. In some embodiments, the multiple video content streams can be multiple football games. Thus, the users 116, 122 can adjust the display so that a certain football game is presented on the primary screen region of the display and the other football games are presented on the multiple auxiliary screen regions. Further, the system 100 can be configured by the video content provider or by the users 116, 122 to detect an event in the any of the presented football games (i.e. video content streams).

The multiple video content streams can include multiple images of multiple objects resulting in multiple object images. For example, in the broadcast of multiple football games, there can be several different objects that can be associated with an event. Objects can include a football within a particular football game, players in particular football games, yard markers (e.g. 50 yard line, goal line, end zone, etc.), etc. One event can be when a football within a particular football game crosses the 20 yard line toward the end zone when a team is on offense. The area between the 20 yard line and the end zone is called the red zone. Thus, an event can be configured to be when the football enters the red zone in a particular or any football game.

Each of the multiple video content streams that include football games includes a plurality of images of the football (i.e. object). A premises device 110 or a network device (which can be one of the servers 126) can use image processing and image recognition techniques to process the plurality of images of the football to determine when a football for a particular game has entered the red zone. When the premises device 110 or a network device process each of, or a subset of, images from the video content streams, and recognizes an event such as a football entering a red zone, an object indication is generated that includes the event (e.g. football in a particular football game has entered the red zone). In some embodiments, when the object indication is generated by the network device, the network device provides the object indication to the premises device 110. The premises device 110 detects the event by identifying the event in the object indication. In further embodiments, the premises device 110 processes the multiple images of the football (e.g. object) of the multiple football games using image processing and image recognition techniques to detect an event that a football in a particular game has entered the red zone. In additional embodiments, other events in football games can include a particular player in a particular football game has entered the end zone with the football indicating the scoring of a touchdown, or a football kicked through the uprights indicating a field goal.

In one or more embodiments, events can be configured to be anything considered significant in any of the multiple video content streams by the video content provider or users 116, 122, or any other person or entity. For example, an event can be a soccer goal passing within a goal indicating scoring of a goal. In another example, an event can be an exciting chase scene in a particular movie. A further example can be a battle scene in a particular scene. An additional example can be a speech being given by a political leader.

In one or more embodiments, the premises device can detect two events or obtain two object indications each containing an event for two different video content streams within a configurable predetermined threshold. For example, the premises device 110 receives an object indication containing an event that the football is in the red zone for a first football game and another object indication containing another event that the football is in the red zone for a second football game. The events are detected within one second (i.e. the predetermined threshold) of each other. Thus, there may be a configurable predetermined priority to determine which football game to present on the primary screen region upon detecting the two events. For example, the second football game can have a player that the users 116, 122 prefers to view (e.g. due to the player being on the users 116, 122 fantasy football team) while the first football game has no players the users 116, 122 prefers to view. Thus, the second football game is indicated by the premises device 110 to be presented on the primary screen region. Hence, a red zone event in the second football game are given a higher priority than a red zone event in the first football game when each event is detected within the predetermined threshold.

In one or more embodiments, a first video content stream can be presented on the primary screen region of a display (of the television 114 or of the virtual reality headset 120). Further, the premises device 110 can detect an event in a second video content stream that is presented in one of the auxiliary screen regions of the display. Responsive to detecting the event, the premises device 110 can provide an indication to the television 114 or virtual reality headset 120 and/or the displays thereof. The indication instructs the display to present the video content stream on the primary screen region according to the detecting of the event. This allows the users 116, 122 not to miss any upcoming content the users 116, 122 might be interested in viewing from the second video content stream. For example, if the first video content stream is a first football game and the second video content stream is a second football game, the event detected can be that the football in the second football game has entered the red zone. Thus, the second football game is presented automatically on the primary screen region of the display upon detecting the event such that the users 116, 122 do not miss on the possibility of viewing a score in the second football game. In another example, the first video content stream can be a first movie and the second video content stream can be a second movie. The detected event in the second movie can be the start of an exciting chase scene. Thus, the second movie is presented automatically on the primary screen region of the display upon detecting the event such that the users 116, 122 do not miss on the viewing the exciting chase scene. In a further example, the first video content stream can be a television program and the second video content stream can be news content. The detected event in the news content can be the start of a speech by a political leader. Thus, the news content is presented automatically on the primary screen region of the display upon detecting the event such that the users 116, 122 do not miss on the speech of the political leader.

In one or more embodiments, the display does not automatically present the second video content stream upon obtaining an indication of an event. In some embodiments, the primary screen region of the display can present text indicating the event in the second video content stream such that the users 116, 122 can then provide user-generated input indicating to the display and/or premises device 110 to provide/present the second video content stream on the primary screen region.

In one or more embodiments, the premises device 110 can be configured to record the second video content stream a priori in anticipation of the event. Thus, the if the event happens quickly and is over by a time that the second video content stream is presented on the primary screen region, the user can access or the premises device 110 can be configured to provide to the display a recorded portion of the second video content stream containing the event to present on the primary screen region.

In one or more embodiments, when the second video content stream is presented on the primary screen region, the first video content stream can be presented on one of the auxiliary screen regions.

In one or more embodiments, when the first video content stream is removed from the primary screen region and the second video content stream is presented on the primary screen region, the audio content associated with first video content stream can be still configured to be played by the television 114 or virtual reality headset 120. Thus, the users can view the event in the second video content stream presented on the primary screen region but still follow the first video content stream by listening to its audio content. For example, if the first video content stream is a first football game and the second video content is a second football game, when the second football game is presented on the primary screen region due to a red zone event, the users 116, 122 can still follow the first football game by listening to its audio content.

In one or more embodiments, when the first video content stream is removed from the primary screen region, the first video content stream can be recorded from a point of departure by the premises device 110 resulting in a recorded first video content stream. A point of departure can be a point in time in the first video content stream when the first video content stream is removed from presentation on the primary screen region. In some embodiments, after viewing an event in the second video content stream on the primary screen region, the premises device 110 can obtain user generated input directing the premises device to provide the recorded first video content stream back on the primary screen region.

In one or more embodiments, the premises device 110 can remove advertising content from the recorded first video content stream. For example, if the first video content stream is a football game and the recording of the football game includes embedded commercials or other adverting content, then the premises device 110 can remove, discard, or delete the advertising content from the recording of the football game. This allows the users 116, 122 to catch up to viewing the football game in real-time and prevents the users 116, 122 to receive information (e.g. social commentary from a social connection) regarding a portion of football game prior to viewing the real-time portion of the football game, thereby ruining the viewing experience.

Referring to FIG. 4, in one or more embodiments, a time line 412 is associated with a first video content stream 408 and a timeline 414 is associated with a second video content stream 410. The timelines 412, 414 are shown for a period of time between 12:00 and 3:00. A portion 430 of the first video content stream is presented on a primary screen region of a display and a portion 440 of the second video content stream is presented on an auxiliary screen region of the display. In some embodiments, at a time 12:45 the first video content stream is removed from being presented on the primary screen region and the second video content stream is presented on the primary screen region. Thus, 12:45 is a point of departure 416 for the first video content stream being removed from the primary screen region. Also, 12:45 is a point of departure 422 for the second video content stream being removed from the auxiliary screen region. The premises device 110 can record a portion 432 of the first video content stream while the second video content stream 442 is presented on the primary screen region. The first video content stream may have been removed from the primary screen region and the second video content stream presented on the primary screen region due to detection of an event in the second video content stream or receipt of user-generated input indicating the switch. Responsive to receipt of the user-generated input, the premises device 110 provides a message to the display to present the second video content stream on the primary screen region according to the user-generated input.

In one or more embodiments, at a time 1:15 418, the display is instructed, due to detection of another event or user-generated input, or by the event in the second video content stream being completed, to present the first video content stream. The time 1:14 418 can be called a point of return. In some embodiments, the premises device 110 provides the recorded first video content stream to the display for presentation on the primary screen region. Accordingly, the display presents the recorded portion 434 of the first video content stream on the primary screen region. The premises device 110 may have removed advertising content from the recorded portion 434 of the first video content stream such that the user can "catch up" and view the first video content in real-time in the future. Thus, at a time 1:30 420, presentation of the recorded portion 434 is complete and the premises device 110 presents the remaining portion 436 of first video content stream in real-time until the end of the time period 421. In other embodiments, when the recorded portion 434 of the first video content stream is presented on the primary screen region at the point of return 418, the second video content stream can be presented on the auxiliary screen region at its point of return 424. The remaining portion 444 of the second video content stream is presented on the auxiliary screen region until the end of the time period. In some embodiments, the first video content stream is presented back on the primary screen region responsive to user-generated input. In other embodiments, the first video content stream is presented back on the primary screen region responsive to determining an event has been completed.

In one or more embodiments, in addition to or instead of removing advertising content from the recorded first video content stream, other portions that the user would like to ignore and not view can be removed. For example, when a first video content stream is a football game, the action of the game is during a play. A user may not want to view recorded portions of the football game that do not have any action of the game such as viewing the teams huddle, replays, official announcements, or any other content between plays. The broadcast of the football game can contain action start flags and action end flags that can be used by the premises device 110 to demarcate the action portions and non-action portions of the football game. Further, the premises device 110 can record the action portions of the game and remove or discard non-action portions of the game. For example, the premises device 110 can detect a first action start flag and a first action end flag. The first action start flag signals to the premises device 110 the start of a first play of the football game and the first action end flag signals to the premises device the end of the first play of the football game. In addition, the premises device 110 can detect a second action start flag and a second action end flag. The second action start flag signals to the premises device 110 the start of a second play of the football game and the second action end flag signals to the premises device the end of the second play of the football game. The premises device 110 can record portions of the football game between the first action start flag and the first action end flag as well as the second action start flag and the second action end flag. Also, the premises device 110 can remove or discard the portion of the first video content stream between the first action end flag and the second action start flag. In some of the embodiments, instead of a premises device 110, a network device such as one of the servers 126 can record portions of the football between the first action start flag and the first action end flag as well as the second action start flag and the second action end flag. Also, such a network device can remove or discard the portion of the first video content stream between the first action end flag and the second action start flag.

In one or more embodiments, the premises device 110 can select a multiple images of the recorded first video content stream that contain multiple objects that indicate action portions of the first video content stream and non-action portions of the recorded first video content stream. For example the when the first video content stream is a football game, the premises device 110 can be configured to select the multiple images of the first video content stream containing a game clock. Further, the premises device 110 can determine a first subset of the multiple selected images as having a running game clock and a second subset of the multiple selected images as not having a running game clock The premises device 110 can record the first subset of multiple selected images and remove or discard the second subset of multiple selected images. In some of the embodiments, instead of a premises device 110, a network device such as one of the servers 126 can record the first subset of multiple selected images and remove or discard the second subset of multiple selected images.

Figure 5:
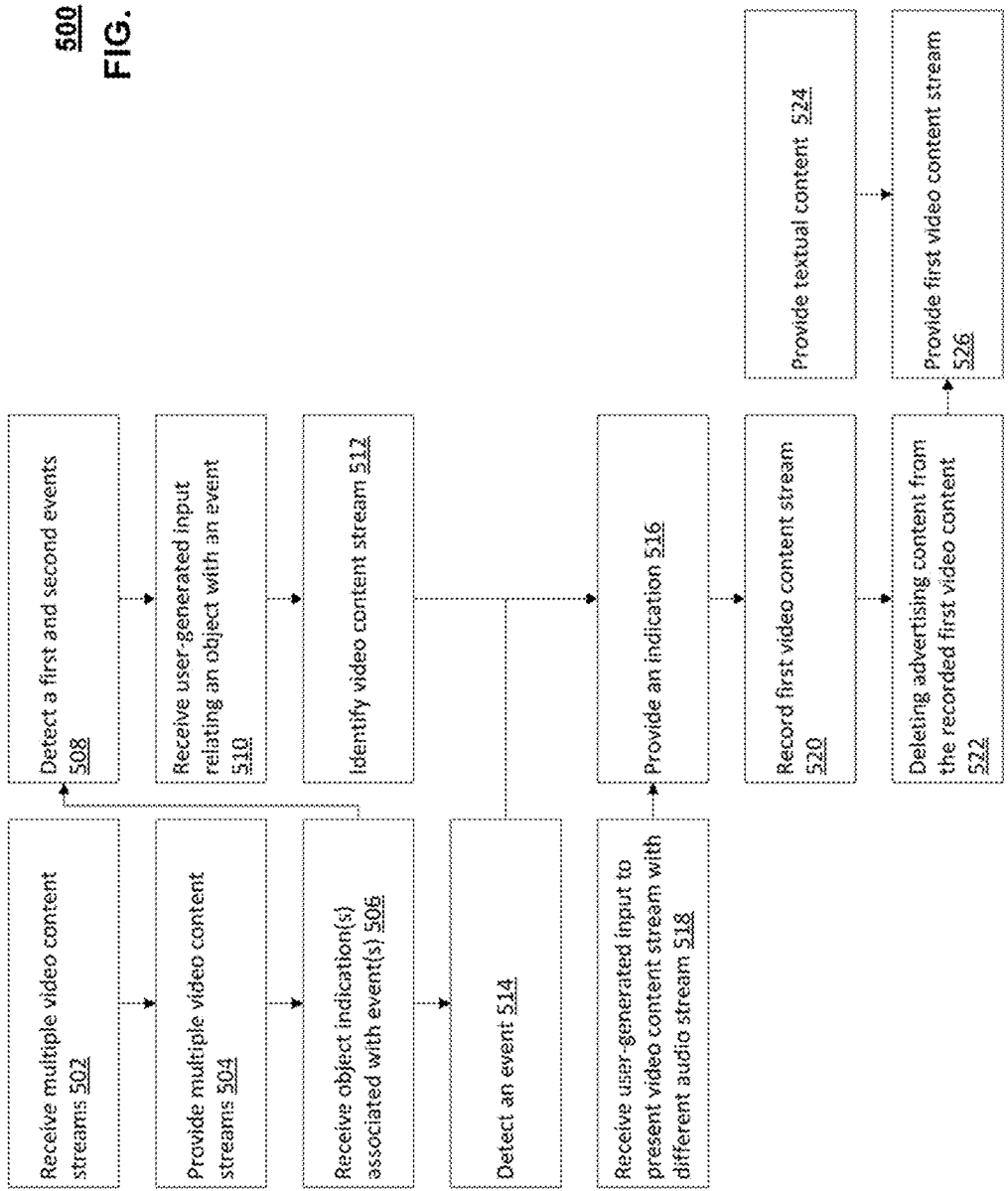
FIGS. 5-7 depict illustrative embodiments of methods used in portions of the systems described in FIGS. 1-4.
Figure 6:
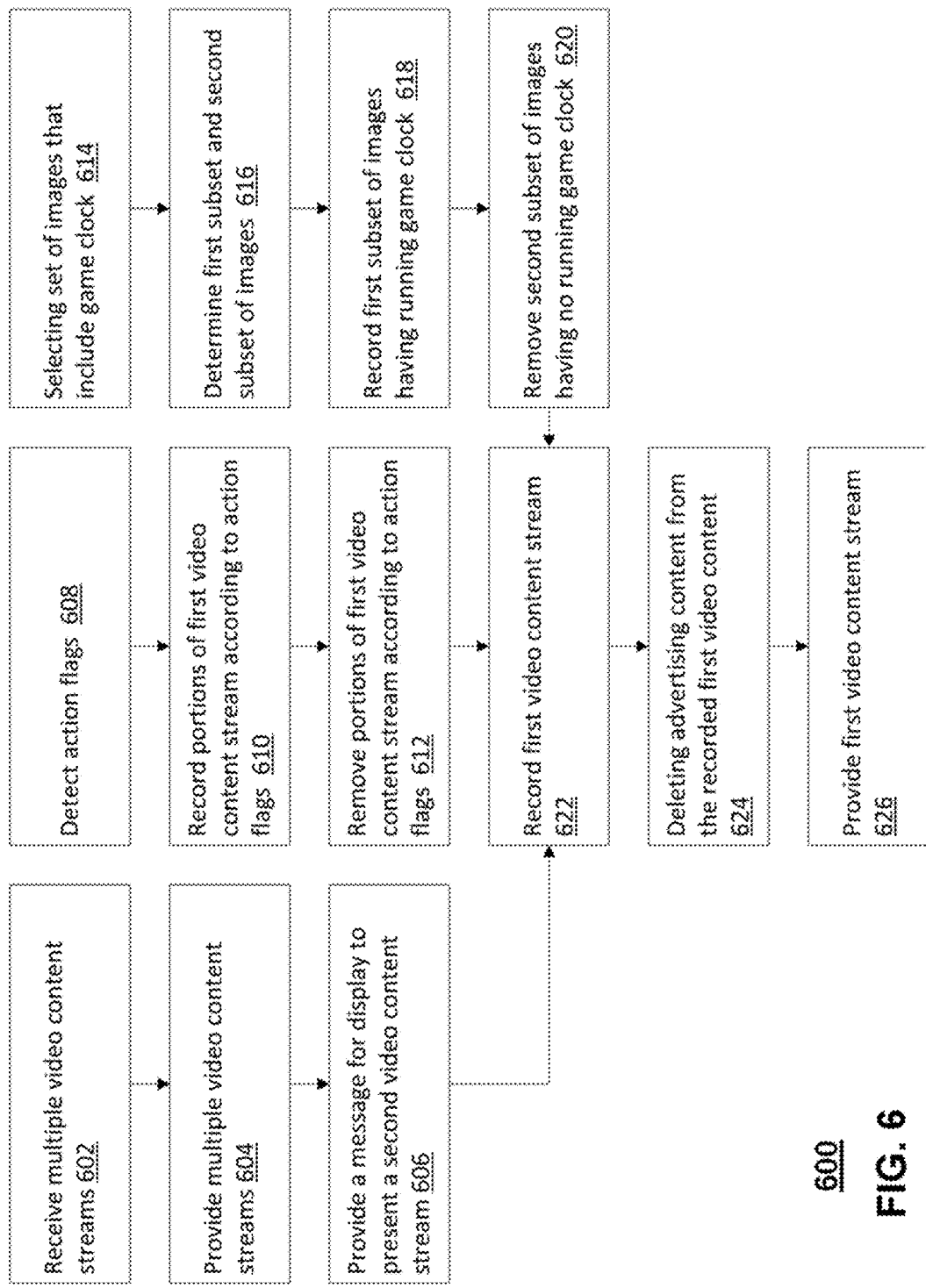
Figure 7:
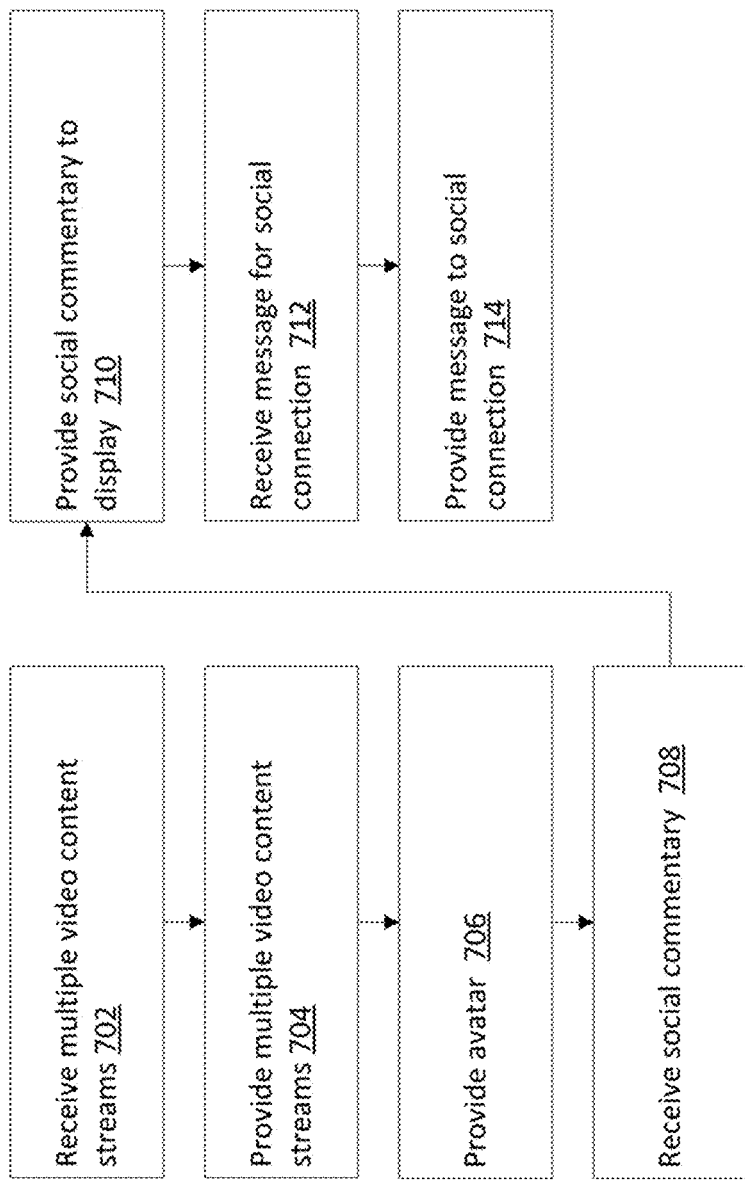

FIGS. 5-7 depict illustrative embodiments of methods for providing multiple video content streams used in portions of the systems described in FIGS. 1-4. Referring to FIG. 5, the method 500 can include, at a step 502, a premises device 110 receiving multiple video content streams. At a step 504, the method 500 can further include the premises device 110 providing the multiple video content streams to a display for presentation of the multiple of video content streams. The display can comprise multiple screen regions including a primary screen region that presents a first video content stream of the multiple video content streams. Further, the multiple screen regions can comprise multiple auxiliary screen regions that present a subset of the plurality of video content streams. A first video content stream can be presented on the primary screen region and a second video content stream can be presented on an auxiliary screen region. At a step 506, the method 500 can additionally include the premises device 110 receiving an object indication for each of multiple events resulting in multiple object indications.

At a step 514, the method 500 can include the premises device 110 detecting the event. Further, at a step 508, the method 500 can include the premise device 110 detecting a first event associated with a third video content stream and a second event associated with a fourth video content stream of the multiple video content streams within a time period (e.g. configurable predetermined threshold). At a step 510, the method 500 can additionally include the premises device 110 receiving user generated-input pertaining to one of the third video content stream and the fourth video content stream. For example, the user-generated input can include a selection of either the third video content stream or the fourth video content stream. Also, at a step 512, the method 500 can include the premises device 110 identifying the video content stream having the event as one of the third video content stream and the fourth video content stream according to the second user-generated input.

At a step 516, the method 500 can include the premises device 110 providing an indication to the display responsive to the detecting of the event. The indication instructs the display to present the second video content stream on the primary screen region according to the detecting of the event. At a step 518, the method 500 can also include the premises device 110 receiving user generated input to present the second video content stream on the primary screen region but provide a different audio content that is not associated with the second video content stream. For example, the first video content stream can be a first football game and the second video content stream can be a second football game. Although the second football game is presented on the primary screen region in response to detecting an event, a user may still want to listen to the audio content of the first football game to follow the first football game while viewing the second football game.

Further, at a step 520, the method 500 can include the premises device 110 recording the first video content stream from a point of departure of the first video content stream resulting in a recorded first video content stream. In addition, at a step 522, the method 500 can include the premises device 110 removing, discarding, or deleting advertising content from the recorded first video content stream. Also, at step 526, the method 500 can include the premises device 110 providing the recorded first video content stream to the display for presentation on the primary screen region responsive to obtaining user-generated input. The user-generated input indicates to switch from presenting the second video content steam on the primary screen region to presenting the recorded first video content stream on the primary screen region.

At a step 524, the method 500 can include the premises device 110 providing textual content to the display to be presented with the multiple video content streams. For example, if the multiple video content streams are multiple football games, then the textual information can include football statistics, fantasy football statistics, game schedules, etc.

Referring to FIG. 6, the method 600 can include, at a step 602, a premises device 110 receiving multiple video content streams. At a step 604, the method 600 can further include the premises device 110 providing multiple video content streams to a display for presentation of the multiple video content streams. The display comprises multiple screen regions including a primary screen region that presents a first video content stream of the plurality of video content streams. The multiple screen regions also include multiple auxiliary screen regions that present a subset of the plurality of video content streams. A second video content stream can be presented on an auxiliary screen region. In addition, at a step 606, the method 600 can include the premises device 110 providing a message to the display responsive to receiving user-generated input. The message can instruct the display to present the second video content stream on the primary screen region.

At a step 608, the method 600 can include the premises device 110 detecting a first action start flag, a first action end flag, a second action start flag, and a second action end flag in the first video content stream. Further, at a step 610, the method 600 can include the premises device 110 recording content between the first action start flag and the first action end flag and between the second action start flag and the second action end flag. In addition, at a step 612, the method 600 can include the premises device 110 removing content between the first action end flag and the second action start flag.

At step 614, the method 600 can include the premises device 110 selecting multiple images of the recorded first video content stream resulting in multiple selected images. The multiple selected images include an image of a game clock. Further, at a step 616, the method 600 can include the premises device 110 determining a first subset of the plurality of selected images having images of a running game clock and a second subset of the plurality of selected images not having images of a running clock. Also, at a step 618, the method 600 can include the premises device 110 recording the first subset of the plurality of selected images resulting in a recorded first subset of the plurality of selected images.

The recorded first video content stream is the recorded first subset of the plurality of selected images. At a step 620, the method 600 can include the premises device 110 removing the second subset of the plurality of selected images from the recorded first video content stream.

At a step 622, the method 600 can include the premises device 110 recording the first video content stream from a point of departure of the first video content stream resulting in recorded first video content stream. This can include aggregating portions of recorded content from steps 608-612 and steps 614-620. Further, at a step 624, the method 600 can include the premises device 110 deleting advertising content from the recorded first video content stream. In addition, at a step 626, the method 600 can include the premises device 110 providing the recorded first video content stream to the display responsive to obtaining user-generated input. The recorded first video content stream is presented on the primary screen region of the display from the point of departure.

Referring to FIG. 7, method 700 can include, at a step 702, the premises device 110 receiving multiple video content streams. At a step 704, the method 700 can further include the premises device 110 providing multiple video content streams to a display for presentation. In addition, at a step 706, the method 700 can include the premises device 110 providing an avatar associated with a social connection to be presented on the display with the multiple video content streams. Also, at a step 708, the method 700 can include the premises device 110 receiving social commentary for a social connection. The social connection can be a connection from a social media website and/or a contact listed in the directory of a mobile phone, or any other person or entity that has a social relationship with a user. At a step 710, the method 700 can include the premises device 110 providing social commentary to the display to be presented with the plurality of video content streams. The social commentary can be related to the multiple video content streams. In some embodiments, the social commentary is provided by a voice-to-text input device. At a step 712, the method 700 can include the premises device 110 receiving a message for the social connection from the user viewing the display. The message can be related to the multiple video content streams presented on the display. At a step 714, the method 700 can include the premises device 110 providing the message for the social connection to a communication device associated with the social connection. In other embodiments, the message can be provided by the premises device 110 to a social media server to be listed on a social media website or mobile application.

While for purposes of simplicity of explanation, the respective processes are shown and described as a series of blocks in FIGS. 5-7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
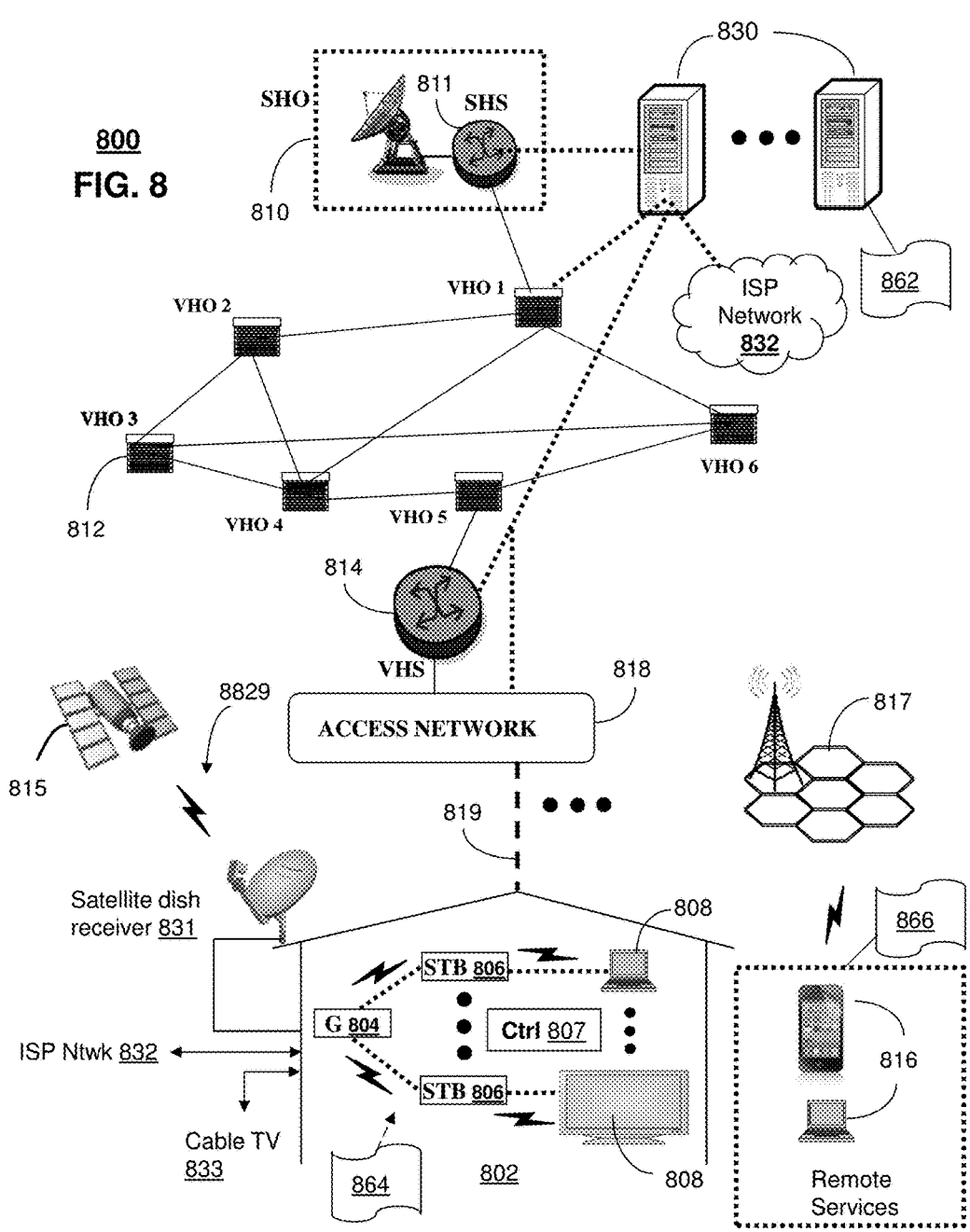
FIG. 8 depicts an illustrative embodiment of a communication system that provides multiple video content streams to a premises.

FIG. 8 depicts an illustrative embodiment of a first communication system 800 for delivering media content. The communication system 800 can represent an Internet Protocol Television (IPTV) media system. Communication system 800 can be overlaid or operably coupled with systems 100, 200, 300, 400 of FIGS. 1-4 as another representative embodiment of communication system 800. For instance, one or more devices illustrated in the communication system 800 of FIG. 8 can include providing multiple video content streams to a display for presentation. The display comprises a primary screen region that presents a first video content stream of the multiple video content streams and multiple auxiliary screen regions that present a subset of the multiple video content streams. A second video content stream can be presented on one of the auxiliary screen regions. Further, the devices can also include providing a message to the display responsive to receiving a first user-generated input instructing the display to present a second video content stream on the primary screen region. In addition the devices may include recording the first video content stream from a point of departure of the first video content stream. Also, the devices can include providing the recorded first video content stream to the display responsive to obtaining a second user-generated input. The recorded first video content stream is presented on the primary screen region from the point of departure.

The IPTV media system can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol.

The VHS 814 can distribute multimedia broadcast content via an access network 818 to commercial and/or residential buildings 802 housing a gateway 804 (such as a residential or commercial gateway). The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services. System 800 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to function as one or more servers (herein referred to as server 830). The one or more servers can provide multiple video content streams, manage the multiple video content streams, provide textual informational related to the multiple video content streams, and exchange messages or social commentary between a user and the user's social connection related to the multiple video content streams. The server 830 can use computing and communication technology to perform function 862, which can include among other things, the techniques for providing multiple video content streams described by methods 500, 600, 700 of FIGS. 5-7. For instance, function 862 of server 830 can be similar to the functions described for servers 126 of FIG. 1 in accordance with methods 500, 600, 700. The media processors 806 and wireless communication devices 816 can be provisioned with software functions 864 and 866, respectively, to utilize the services of server 830. For instance, functions 864 and 866 of media processors 806 and wireless communication devices 816 can be similar to the functions described for the devices 110, 114, 118, 120 of FIG. 1 in accordance with methods 500, 600, 700.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 9:
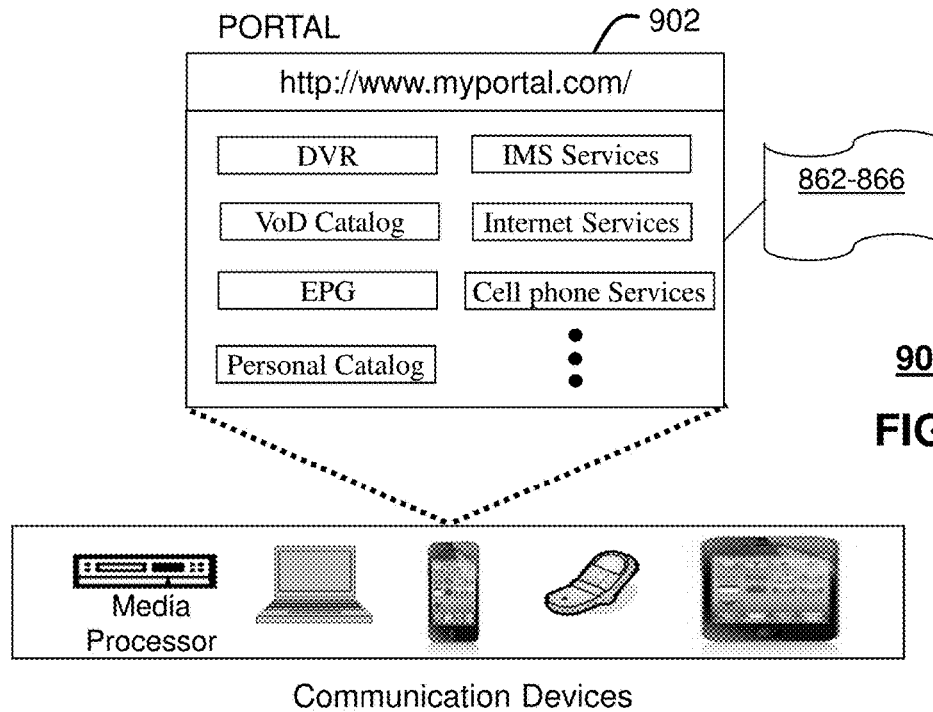
FIG. 9 depicts an illustrative embodiment of a web portal for interacting with the communication systems of FIGS. 1-4, and 8 to manage delivery of multiple video content streams to a premises.

FIG. 9 depicts an illustrative embodiment of a web portal 902 of a communication system 900. Communication system 900 can be overlaid or operably coupled with systems 100, 200, 300, 400, of FIGS. 1-4, and communication system 800 as another representative embodiment of systems 100, 200, 300, 400, of FIGS. 1-4, and communication system 800. The web portal 902 can be used for managing services of systems 100, 200, 300, 400, of FIGS. 1-4, communication and communication system 800. A web page of the web portal 902 can be accessed by a Uniform Resource Locator (URL) with an Internet browser using an Internet-capable communication device such as those described in FIGS. 1-4 and FIG. 8. The web portal 902 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 902 can also be used for provisioning IMS services described earlier, provisioning Internet services, provisioning cellular phone services, and so on.

The web portal 902 can further be utilized to manage and provision software applications 862-866 to adapt these applications as may be desired by subscribers and/or service providers of systems 100, 200, 300, 400 of FIGS. 1-4, and communication system 800. For instance, users of the services provided by servers 126 or server 830 can log into their on-line accounts and provision the servers 126 or server 830, and so on. Also, the user can configure which video content streams to present on the different screen regions (e.g. primary screen region, auxiliary screen region, etc.) Further, user can configure events for each of the multiple video content streams or a subset thereof. In addition, the user can configure a time period or predetermined time threshold to detect multiple events. Service providers can log onto an administrator account to provision, monitor and/or maintain the systems 100, 200, 300 of FIGS. 1-4 or server 830.

Figure 10:
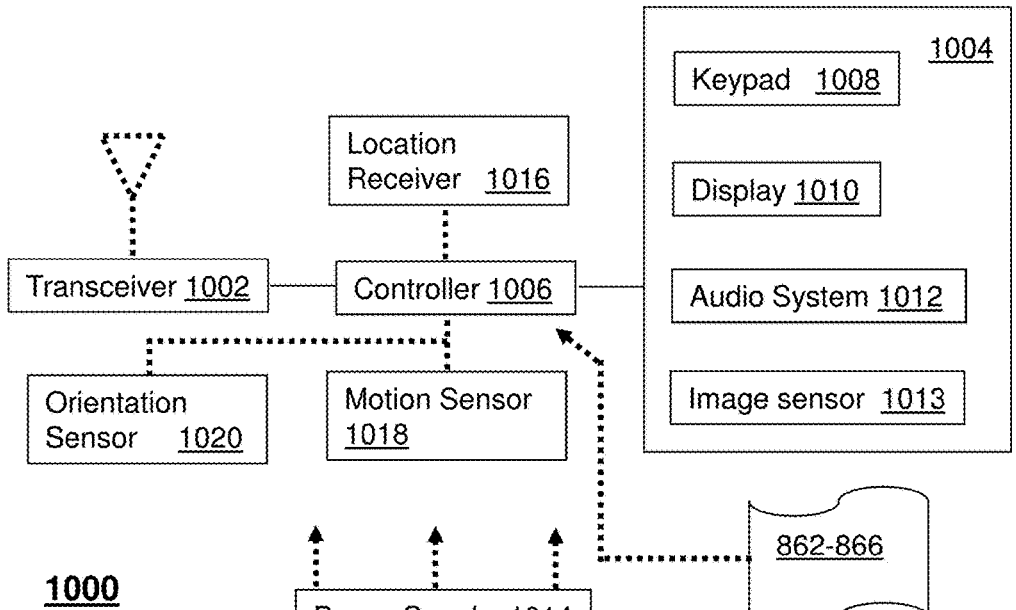
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 1-3, and FIG. 8 and can be configured to perform portions of methods 500, 600, 700 of FIGS. 5-7.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of devices 108, 110, 114, 118, 120, and 126, 202, 300 of FIGS. 1-3, the media processor 806, the media devices 808, or the portable communication devices 816 of FIG. 8. It will be appreciated that the communication device 1000 can also represent other devices that can operate in systems of FIGS. 1-3, communication system 800 of FIG. 8 such as a gaming console and a media player. In addition, the controller 1006 can be adapted in various embodiments to perform the functions 862-866, respectively.

Upon reviewing the aforementioned embodiments, it would be evident to an artisan with ordinary skill in the art that said embodiments can be modified, reduced, or enhanced without departing from the scope of the claims described below. For example, portions of some embodiments can be combined with portions other embodiments. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
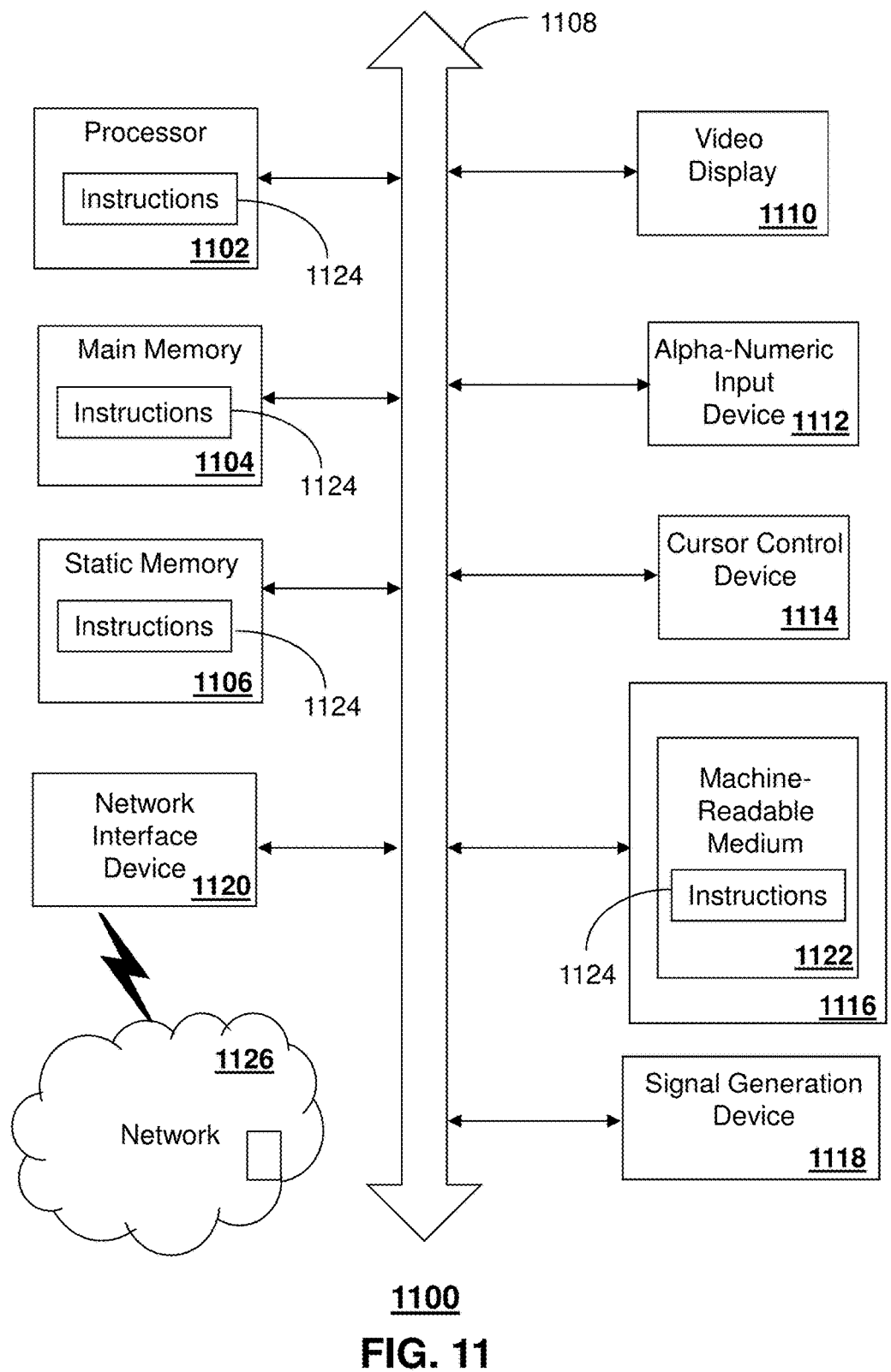
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the server 830, the media processor 806, communication devices 108, 110, 114, 118, 120, and 126, 202, 300, and other devices of FIGS. 1-3. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 810 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
rendering a plurality of video content streams into a plurality of screen regions as part of a virtual reality environment for presentation of the plurality of video content streams in the virtual reality environment, wherein the plurality of screen regions include a primary screen region and a plurality of auxiliary screen regions, wherein the primary screen region presents a first video content stream of the plurality of video content streams, and wherein the plurality of auxiliary screen regions presents a subset of the plurality of video content streams;
detecting an event in a second video content stream of the plurality of video content streams resulting in a detected event;
providing an indication to the virtual reality environment responsive to the detecting of the event, wherein the indication instructs the virtual reality environment to present the second video content stream on the primary screen region in place of the first video content stream according to the detecting of the event;
recording the first video content stream from a point of departure of the first video content stream resulting in a recorded first video content stream;
selecting a plurality of images of the recorded first video content stream resulting in a plurality of selected images, wherein the plurality of selected images includes an image of an action portion;
determining a first subset of the plurality of selected images having images of the action portion and a second subset of the plurality of selected images not having images of the action portion; and
recording the first subset of the plurality of selected images resulting in a recorded first subset of the plurality of selected images, and wherein the recorded first video content stream is the recorded first subset of the plurality of selected images.

2. The device of claim 1, wherein the operations further comprise providing the recorded first video content stream to the virtual reality environment for presentation on the primary screen region from the point of departure responsive to obtaining a first user-generated input.

3. The device of claim 2, wherein the first user-generated input initiates a switch from presenting the second video content stream on the primary screen region to presenting the recorded first video content stream on the primary screen region, and wherein the virtual reality environment is provided by a virtual reality display device.

4. The device of claim 2, wherein the detecting of the event further comprises:
detecting a first event associated with a third video content stream and a second event associated with a fourth video content stream of the plurality of video content streams within a time period;
receiving a second user-generated input pertaining to one of the third video content stream and the fourth video content stream; and
identifying the second video content stream having the detected event as one of the third video content stream and the fourth video content stream according to the second user-generated input.

5. The device of claim 2, wherein the first user-generated input is one of a voice command, head movement, gesture, text, and graphics, and wherein the primary screen region is a first size and the plurality of auxiliary screen regions are a second size, and
wherein the recording of the first video content stream further comprises removing the second subset of the plurality of selected images.

6. The device of claim 5, wherein presentation of a plurality of screens selectively changes the primary screen region to one of the plurality of auxiliary screen regions based upon the head movement.

7. The device of claim 1, wherein the plurality of images includes a plurality of objects resulting in a plurality of object images, and wherein the operations further comprise obtaining an object indication for each of the plurality of object images resulting in a plurality of object indications, and wherein a first object indication of the plurality of object indications comprises the event and the event is associated with a first object of the plurality of objects.

8. The device of claim 1, wherein the operations further comprise receiving a third user-generated input, wherein the first video content stream is presented on the primary screen region with a first audio content, and wherein the second video content stream is presented on the primary screen region with the first audio content according to the third user-generated input.

9. The device of claim 1, wherein the operations further comprise providing textual content related to the plurality of video content streams, wherein the textual content is presented in the virtual reality environment with the first video content stream and the subset of the plurality of video content streams.

10. A non-transitory, machine-readable storage medium, comprising executable instructions that, when executed by a processing system including a processor, facilitate performance of operations, comprising:
rendering a plurality of video content streams into a plurality of screen regions of a virtual reality display as part of a virtual reality environment for presentation of the plurality of video content streams in the virtual reality environment, wherein the plurality of screen regions include a primary screen region and a plurality of auxiliary screen regions, wherein the primary screen region presents a first video content stream of the plurality of video content streams, and wherein the plurality of auxiliary screen regions presents a subset of the plurality of video content streams;
detecting an event in a second video content stream of the plurality of video content streams resulting in a detected event;

providing an indication to the virtual reality display responsive to the detecting of the event, wherein the indication instructs the virtual reality display to present the second video content stream on the primary screen region in place of the first video content stream according to the detecting of the event;

recording the first video content stream from a point of departure of the first video content stream resulting in a recorded first video content stream;

selecting a plurality of images of the recorded first video content stream resulting in a plurality of selected images, wherein the plurality of selected images includes an image of an action portion;

determining a first subset of the plurality of selected images having images of the action portion and a second subset of the plurality of selected images not having images of the action portion; and recording the first subset of the plurality of selected images resulting in a recorded first subset of the plurality of selected images, and wherein the recorded first video content stream is the recorded first subset of the plurality of selected images.

11. The non-transitory, machine-readable storage medium of claim 10, wherein the recording of the first video content stream further comprises deleting advertising content from the recorded first video content stream.

12. The non-transitory, machine-readable storage medium of claim 10, wherein the recording of the first video content stream further comprises detecting a first action start flag, a first action end flag, a second action start flag, and a second action end flag in the first video content stream.

13. The non-transitory, machine-readable storage medium of claim 12, wherein the recording of the first video content stream further comprises recording content between the first action start flag and the first action end flag and between the second action start flag and the second action end flag.

14. The non-transitory, machine-readable storage medium of claim 13, wherein the recording of the first video content stream further comprises removing content between the first action end flag and the second action start flag.

15. The non-transitory, machine-readable storage medium of claim 10, wherein the recording of the first video content stream further comprises removing the second subset of the plurality of selected images.

16. The non-transitory, machine-readable storage medium of claim 10, wherein the operations further comprise providing the recorded first video content stream to the virtual reality display for presentation on the primary screen region from the point of departure responsive to obtaining a first user-generated input.

17. The non-transitory, machine-readable storage medium of claim 16, wherein the first user-generated input initiates a switch from presenting the second video content stream on the primary screen region to presenting the recorded first video content stream on the primary screen region.

18. A method, comprising:

rendering, by a processing system comprising a processor, a primary screen region of a plurality of screen regions of a virtual reality environment to present a first video content stream of a plurality of video content streams and a plurality of auxiliary screen regions in the virtual reality environment to respectively present a subset of the plurality of video content streams;

providing, by the processing system, an indication to a virtual reality display responsive to an occurrence of an event in a second video content stream of the plurality of video content streams, wherein the indication instructs the virtual reality display to present the second video content stream on the primary screen region in place of the first video content stream based on the occurrence;

recording, by the processing system, the first video content stream from a point of departure of the first video content stream resulting in a recorded first video content stream;

selecting, by the processing system, a plurality of images of the recorded first video content stream resulting in a plurality of selected images, wherein the plurality of selected images includes an image of an action portion;

determining, by the processing system, a first subset of the plurality of selected images having images of the action portion and a second subset of the plurality of selected images not having images of the action portion; and recording, by the processing system, the first subset of the plurality of selected images resulting in a recorded first subset of the plurality of selected images, and wherein the recorded first video content stream is the recorded first subset of the plurality of selected images.

19. The method of claim 18, further comprising:

providing an avatar associated with a social connection to be presented on the virtual reality display with the plurality of video content streams;

receiving a message for the social connection; and providing the message for the social connection to a communication device associated with the social connection, wherein the message is related to the plurality of video content streams.

20. The method of claim 19, wherein the virtual reality display renders the avatar as part of the virtual reality environment, and further comprising enabling presentation of the plurality of screen regions based upon a movement of a virtual reality headset that presents the virtual reality environment, wherein the presentation of the plurality of screen selectively changes the primary screen region to one of the plurality of auxiliary screen regions based upon the movement of the virtual reality headset, and wherein the recording of the first video content stream further comprises removing the second subset of the plurality of selected images.

* * * * *